Dec. 28, 1948.　　　H. F. MAYER　　　2,457,580
RADIO LOCATING EQUIPMENT
Original Filed Nov. 30, 1943　　　　　　　3 Sheets-Sheet 1
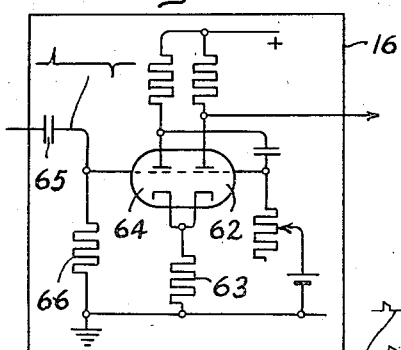
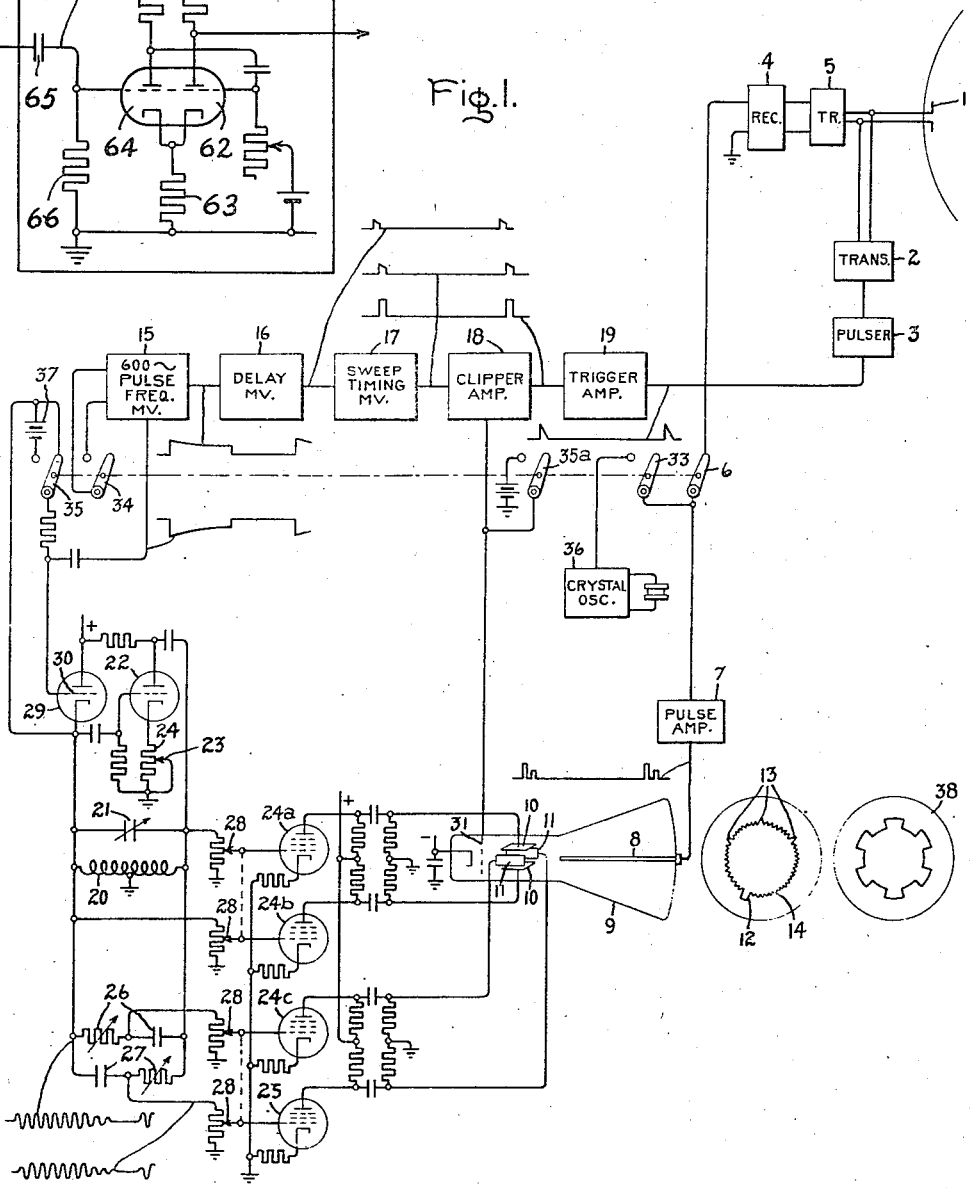
Inventor:
Harry F. Mayer,
by Harry E. Dunham
His Attorney.

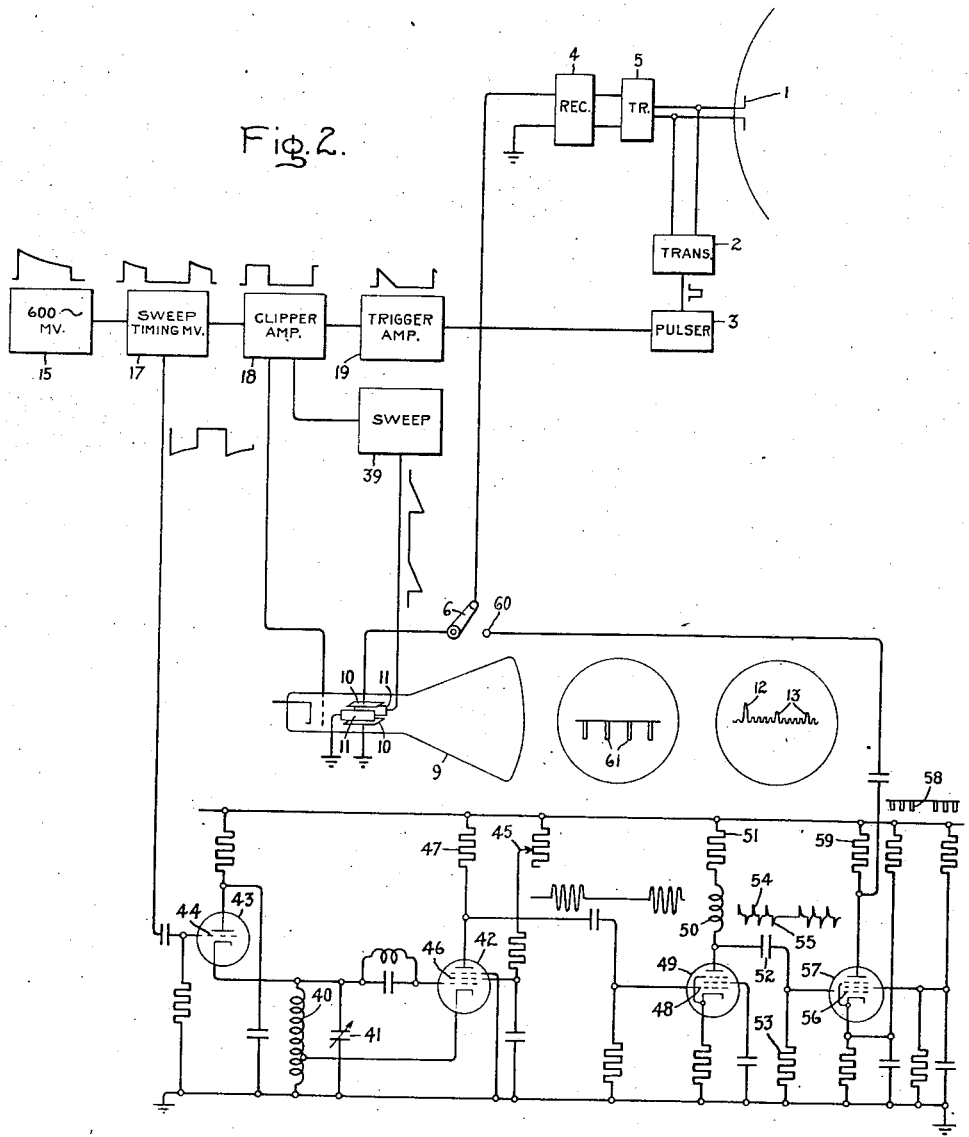

Dec. 28, 1948.  H. F. MAYER  2,457,580
RADIO LOCATING EQUIPMENT
Original Filed Nov. 30, 1943  3 Sheets-Sheet 3

Inventor:
Harry F. Mayer,
by Harry E. Dunham
His Attorney.

Patented Dec. 28, 1948

2,457,580

UNITED STATES PATENT OFFICE 2,457,580

RADIO LOCATING EQUIPMENT

Harry F. Mayer, Schenectady, N. Y., assignor to General Electric Company, a corporation of New York Original application November 30, 1943, Serial No. 512,301. Divided and this application December 26, 1944, Serial No. 569,740

5 Claims. (Cl. 315—22)

The present invention relates to radio locating equipment for determining the range of remote objects by the time of travel of pulses of radio waves and is particularly concerned with circuits for producing synchronized oscillations utilized in providing a time (range) scale.

This is a division of my copending application Serial No. 512,301, filed November 30, 1943 and assigned to the same assignee as the present invention.

An object of my invention is to provide an improved circuit for producing synchronized timing oscillations.

Figure 3:
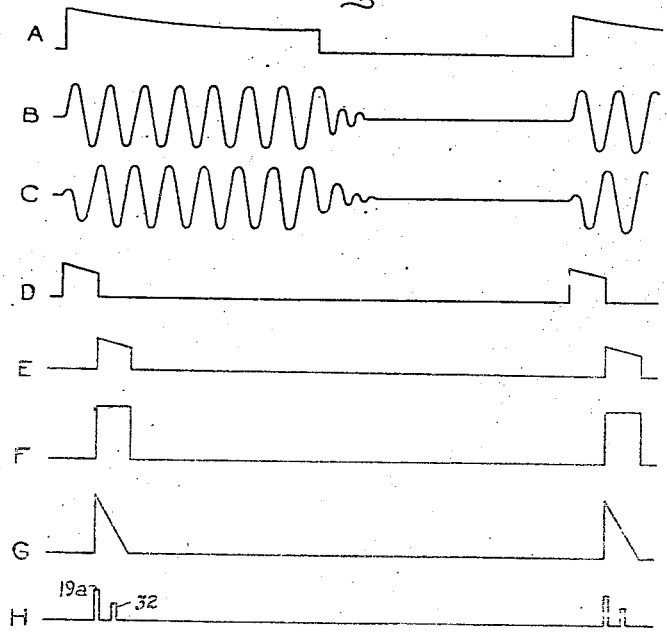
Figure 4:
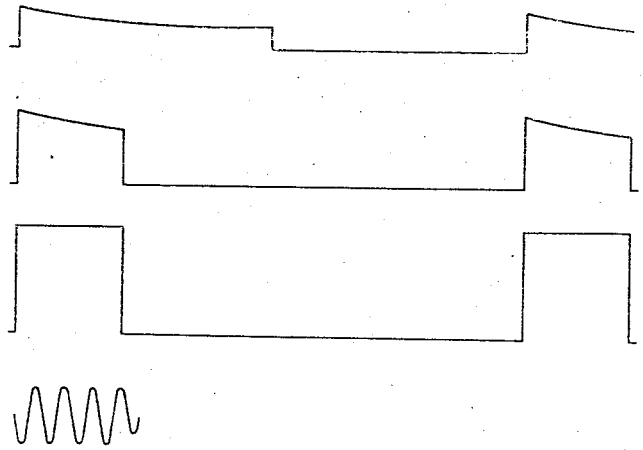

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Figs. 1 and 2 are circuit diagrams of equipment embodying my invention, Figs. 3 and 4 are explanatory diagrams illustrating the operation thereof, and Fig. 5 is a circuit diagram of a delay or sweep timing multivibrator of a type useful in equipment according to my invention.

Referring to Fig. 1 of the drawings, there is shown radio locating equipment having a directional antenna 1 connected to a transmitter 2 keyed by a pulser 3 to transmit directional pulses of radio waves at the desired repetition rate. The antenna is also connected to a receiver 4 through a TR box 5 which limits the amplitude of the pulses appearing at the antenna in such a manner as to prevent injury to the receiver by the transmitted pulses and without offering any substantial resistance to the echoes of the transmitted pulses. The receiver output is fed through a switch 6 and a pulse amplifier 7 to the center electrode 8 of a circular sweep cathode ray tube 9 having a beam deflected in a circular path by A. C. sweep voltages 90 degrees out of phase applied respectively to the vertical and horizontal deflection plates 10 and 11 in a manner hereinafter described. The receiver output which consists of transmitted pulses and echoes arriving after intervals corresponding to the range of the reflecting objects causes radial deflections of the beam which appear on the cathode ray tube viewing screen at 12 and 13. The range of the reflecting objects can be determined by angular distance between the deflection 12 corresponding to the transmitted pulses and the deflections 13 corresponding to the echoes.

It is obvious that the accuracy of the range determination is directly dependent upon the frequency and relative amplitudes of the sweep voltages applied to the deflection plates 10 and 11. Furthermore, the sweep voltages should be synchronized with (i. e., have a definite time phase with respect to) the transmitted pulses so that the starting point of the circular sweep trace (i. e., the zero range point indicated by the deflection 12) will remain fixed on the cathode ray tube viewing screen. This is essential not only for determining the range of the reflecting objects but also for distinguishing the echoes from the non-synchronous noise voltages causing the erratic deflections 14 intermediate the deflections 12 and 13. It is also desirable that the pulse frequency of the transmitter be variable independent of the sweep frequency so as to prevent synchronous interference due to simultaneous operation of more than one equipment in the same locality.

In the present equipment the independent adjustments are obtained by using a pulse frequency multivibrator 15 to initiate the pulse transmission and the generation of the sweep voltages. Because the multivibrator is utilized to initiate these operations the pulse frequency and the frequency of the sweep voltages can be independently varied. The leading edge of the pulse frequency multivibrator output, shown in line A of Fig. 3, fires a delay multivibrator 16 having an output shown in line D of Fig. 3. The delay multivibrator may comprise a circuit of the type shown on page 158 of "Reference Data for Radio Engineers" published by the Federal Telephone and Radio Corporation, copyright 1943. A circuit of this type is shown in Fig. 5 and comprises a pair of triode electron discharge devices, which may be in a single envelope. As usual in such circuits, only one of the two triodes is conductive at one time. In this circuit, the second triode 62 is normally conductive since its control electrode is biased positive with respect to its cathode. Current flowing therethrough and through resistance 63 biases device 64 to the non-conductive condition.

Application of the leading edge of a positive pulse as shown in line A of Fig. 3 from the pulse frequency multivibrator through the differentiating circuit comprising condenser 65 and resistor 66 fires the delay multivibrator 16 to transfer conduction from the second to the first triode, developing a positive output pulse on the anode of the second triode, the pulse being shown on line D in Fig. 3. Conduction shifts back to the second triode to end the output pulse after an interval determined by the values of the circuit components. The trailing edge of the positive pulses produced by the delay multivibrator fires a sweep timing multivibrator 17, the circuit of which is similar to that of the delay multivibrator 16 except that the triodes will be so biased that the first triode is normally conductive and the second triode non-conductive. The output of the sweep timing multivibrator shown in line E of Fig. 3 is amplified and clipped in a clipper amplifier 18 to convert the output to a square wave form indicated in line F of Fig. 3 and is then fed through a trigger amplifier 19 having an output indicated in line G of Fig. 3 with a sharp leading edge for firing the pulser 3 so that the transmitted pulses indicated at 19a in line H of Fig. 3 occur precisely at the leading edge of the sweep timing multivibrator output. As is apparent from Fig. 3, the time interval between the leading edge of the pulse frequency multivibrator output and the transmission of a pulse of radio waves is equal to the delay interval of the delay multivibrator 16. If more than one equipment is to be used in the same locality, interference can be prevented by adjustment of the delay intervals of the respective equipments, provided the delay interval is at least as long as one cycle of the sweep frequency. For example, another equipment might have its delay mulivibrator set to turn its sweep timing multivibrator on at the trailing edge of the output pulse of the sweep timing multivibrator of the present equipment.

Interference may also be avoided by externally synchronizing the pulse frequency multivibrator 15 with a sine wave, each equipment being supplied with a different phase voltage of the same sine wave synchronizing signal.

The sweep voltage is obtained from an oscillator having a resonant circuit consisting of an inductance 20 and a variable condenser 21 coupled to a discharge device 22, the amplitude of the oscillations being adjusted by a slider 23 on a cathode resistor 24. The resonant circuit of the oscillator is tuned to a frequency such that the period of one complete oscillation is equal to the period of the sweep timing multivibrator output. The oscillator output is taken from opposite sides of the grounded center point of the inductance 20 and fed through a push-pull amplifier 24a, 24b, to the vertical plates 10 of the cathode ray tube. The horizontal plates 11 on the cathode ray tube are fed from a similar push-pull amplifier 24c, 25 connected to the oscillator output through resistance-capacitance phase shifting networks 26, 27 which effect a 90-degree phase shift in the voltage fed to the horizontal plates. Because the voltages applied to the horizontal and vertical plates are displaced 90 degrees in time phase, the beam of the cathode ray tube is deflected in a circular trace if the amplitudes of the respective voltages are made equal by adjusting sliders 28 at the inputs of the push-pull amplifiers.

The sweep oscillator is synchronized with the transmitted pulses by a device 29 connected to ground through a branch circuit including part of the inductance 20 and normally biased so as to carry sufficient current to damp oscillations in the sweep oscillator. The device 29 is controlled by applying to its grid 30 a negative pulse from the pulse frequency multivibrator 15 (a mirror image of the positive pulse indicated in line A of Fig. 3) which biases the device 29 to cut-off. The interruption of current through the device 29 causes an induced voltage in the inductance 20 which starts an oscillation in the resonant circuit of the sweep oscillator which is continued at the level determined by the adjustment of the slider 23 on the cathode resistor 24. The oscillator output, as indicated in line B of Fig. 3, starts at the leading edge of the output pulse of the pulse frequency multivibrator and continues at constant amplitude throughout the output pulse. At the end of the output pulse the negative bias on the grid 30 is removed and the current through the device 29 due to its normal bias damps the sweep oscillation within a few cycles. Because the sweep oscillation is started by a transient due to the interruption of a current, the sweep oscillation always starts in the same manner and at the instant of interruption. The sweep oscillation is therefore accurately synchronized with the leading edge of the pulse frequency multivibrator output. While the oscillator output builds up without any substantial delay, there is a delay of the order of the one cycle in the building up of the voltages at the output terminals of the 90-degree phase shift networks 26 and 27, as indicated in line C of Fig. 3. Since the concentricity of the circular sweep depends upon equality of the voltages applied to the deflection plates 10 and 11, the first few cycles of the sweep oscillator voltage would cause a non-circular sweep trace. This is prevented by keeping the grid 31 of the cathode ray tube biased off during the delay interval of the delay multivibrator and biasing the grid on during the sweep timing interval by connection to the output of the clipper amplifier 18. The transmitted pulses and the echoes, one of which is shown at 32 on line H of Fig. 3, accordingly appear on a circular sweep trace on the viewing screen of the cathode ray tube spaced apart in accordance with the range of the reflecting objects.

Since the accuracy of the range determination depends upon the frequency of the sweep oscillator, it is desirable that the frequency of the sweep oscillator be readily calibrated. This is effected by opening the switch 6 to disconnect the receiver 4 and by closing switches 33, 34, 35, 35a which respectively connect a crystal oscillator 36 to the pulse amplifier 7, short circuit the pulse frequency multivibrator 15, connect the grid 30 of the device 29 to a source of negative bias potential 37 which biases the device off and permits continuous oscillation of the sweep oscillator, and connect the grid 31 to a positive bias voltage. A circular trace modulated by the crystal oscillator frequency now appears on the cathode ray tube viewing screen as indicated at 38. The frequency of the sweep frequency oscillator is adjusted until the pattern produced by the crystal oscillator is stationary; then the sweep frequency is an exact submultiple of the crystal frequency. The diameter of the sweep trace can be adjusted by the sliders 28 which also must be adjusted to cause voltages of equal amplitude on the horizontal and vertical deflection plates. If these voltages are unequal, the sweep trace will be an ellipse with the major axis in line with the deflection plates to which the greater voltage is applied. If the phase difference of the deflection voltages is different from 90 degrees, the major axis of the sweep trace will be inclined from the axes of the deflection plates. This results in a "diagonal ellipticity" which is corrected by adjusting the resistances 26 and 27. The concentricity of the sweep trace is adjusted by centering voltages (not shown) applied to the deflection plates. This adjustment can be quickly made at any time by moving the switches to the "calibrate" position. After calibration, the equipment is returned to operation by opening the switches 33, 34, 35, 35a and closing the switch 6. The equipment is now in the operating position and the length of the sweep trace may be adjusted by adjusting the sweep timing multivibrator so the sweep timing interval is equal to 360 degrees of the sweep frequency, i. e., so the sweep trace is a full circle.

In Fig. 2 is shown locating equipment differing from that previously described in the use of a horizontal instead of a circular sweep for the range scale and in the manner of calibrating the range scale. Corresponding parts are indicated by the same reference numerals.

The sweep voltage is derived from a saw-tooth sweep circuit 39 fed from the clipper amplifier 18 and supplying to the horizontal deflection plates 11 of the cathode ray tube a voltage which increases linearly during each sweep timing interval and abruptly decreases at the end of each sweep timing interval. The receiver output is applied through the switch 6 to the vertical deflection plates 10 causing the deflections 12 and 13 respectively corresponding to the transmitted pulses and the echoes and spaced in accordance with the range of the reflecting objects.

The range scale is calibrated by an oscillator having a resonant circuit consisting of an inductance 40 and a condenser 41 coupled to a device 42 in such a manner as to sustain oscillations of a constant amplitude. The inductance 40 is in series with a device 43 (corresponding to device 29 in Fig. 1) having a grid 44 normally biased so as to cause a unidirectional flow of current through the inductance 40 of sufficient magnitude to damp oscillations. When the device 43 is conducting, a unidirectional current flows through the device 42. During the sweep timing interval, the device 43 is biased to cut-off by a negative voltage from the sweep timing multivibrator, the negative voltage being a mirror image of the voltage fed to the clipper amplifier 18. The interruption of the current through the device 43 at the beginning of the sweep timing interval starts a transient oscillation in the resonant circuit 40, 41 which is maintained at the starting level by the device 42. The oscillation level is adjustable by a slider 45 controlling the bias of screen grid 46. At the end of the sweep timing interval, the removal of the cut-off bias on the grid 44 causes a resumption of the flow of current through the device 43 to quickly damp the oscillations in the resonant circuit 40, 41. The output of the oscillator is taken from a load resistor 47 and fed to the grid 48 of a device 49 which functions as a clipper amplifier. In this device the negative halves of the sinusoidal voltage appearing at the load resistor 47 are clipped to a square wave shape which is differentiated by the inductance 50 and resistance 51 and by the condenser 52 and resistance 53 to produce positive and negative peaks 54, 55 coincident with the zero and 180 degree points of the oscillator output. The differentiated voltages are applied to the grid 56 of a device 57 connected as a clipper amplifier. The negative peaks 55 have no effect, but the positive peaks are clipped and amplified causing negative pulse voltages 58 at the load resistor 59. The pulse voltages 58 occur at the beginning of each cycle of oscillation of the oscillator 40, 41, 42, the first pulse occurring coincident with the negative voltage applied to the grid 44 at the beginning of the sweep timing interval. Since the oscillator frequency is known the pulses 58 provide a time scale.

The pulses 58 are used to calibrate the range scale of the equipment by opening the switch 6 and closing the switch on a contact 60 connected to the load resistor 59. This causes deflections 61 on the sweep trace of the cathode ray tube spaced apart from left to right at intervals equal to the period of the oscillator, the first deflection being coincident with the transmitted pulses. Since the time of travel of the pulses of radio waves to and from a reflecting object is a measure of its range, the deflections 61 provide a range scale.

In both forms of the invention, the sweep oscillators (20, 21 of Fig. 1, 40, 41 of Fig. 2) start oscillation synchronous with the keying impulses and without any transients. In each oscillator the transients are eliminated by having the keying device (30 of Fig. 1, 43 of Fig. 2) cause the inductance and condenser of the oscillator circuit to have a current and charge prior to the keying impulse corresponding exactly to some part of the cycle of the steady state oscillation. At the instant of interruption of the current through the keying devices, the resonant circuits of the oscillators are at steady state conditions and the subsequent oscillations build up without any transients.

The keying circuit for the cathode ray display means is described and claimed in my copending application Serial No. 512,301, filed November 30, 1943.

While I have shown particular embodiments of my invention, it will be understood that many modifications may be made without departing from the spirit thereof and I contemplate by the appended claims to cover any such modifications as fall within the true spirit and scope of my invention.

What I claim as new and desire to secure by Letters Patent of the United States, is:

1. In combination, a resonant circuit including an inductance, a discharge device coupled to said circuit so as to sustain oscillations, a branch circuit through said inductance in series with another discharge device normally carrying a unidirectional current sufficient to damp oscillations in said circuit, means for keying said other device off whereby the induced voltage in said inductance starts oscillations in said circuit, a delay multivibrator keyed on by said keying means, a cathode ray tube normally biased off, a circular sweep circuit for said cathode ray tube utilizing said oscillations, and a sweep timing multivibrator keyed by said delay multivibrator for biasing said cathode ray tube on at the end of the delay interval of said delay multivibrator whereby said circular sweep starts at a point determined by said delay interval.

2. In combination, a multivibrator, a sweep frequency oscillator keyed by said multivibrator, a cathode ray tube normally biased off, means excited by said oscillator for deflecting the cathode ray tube beam in a circular trace, delay means made operative by the leading edge of said first multivibrator output, and means for biasing the cathode ray beam on during the operative period of said delay means.

3. In combination, a resonant circuit including an inductance, a discharge device coupled to said circuit so as to sustain oscillations, a branch circuit through said inductance in series with another discharge device normally carrying a unidirectional current sufficient to damp oscillations in said circuit, means for keying off said other device whereby the induced voltage in said inductance starts oscillations in said circuit, delay means keyed on by said keying means, a cathode ray tube normally biased off, a sweep circuit for said cathode ray tube utilizing said oscillations, said delay means being arranged to bias said cathode ray tube on at the end of the delay interval of said delay means whereby the sweep starts at a point determined by said delay interval.

4. In combination, a resonant circuit including an inductance, a discharge device coupled to said circuit so as to sustain oscillations, a branch circuit through said inductance in series with another discharge device normally carrying a unidirectional current sufficient to damp oscillations in said circuit, means for keying off said other device whereby the induced voltage in said inductance starts oscillations in said circuit, delay means keyed on by said keying means, a cathode ray tube normally biased off, a variable frequency sweep circuit for said cathode ray tube utilizing said oscillations, said delay means being arranged to bias said cathode ray tube on at the end of the delay interval of said delay means whereby the sweep starts at a point determined by said delay interval, and means for varying the duration of said delay interval independently of the variation of the frequency of said sweep circuit.

5. In combination, a resonant circuit including an inductance, a discharge device coupled to said circuit so as to sustain oscillations, a branch circuit through said inductance in series with another discharge device normally carrying a unidirectional current sufficient to damp oscillations in said circuit, means for keying off said other device whereby the induced voltage in said inductance starts oscillations in said circuit, a cathode ray tube normally biased off and having vertical and horizontal deflecting means, means for impressing said oscillations on one of said deflection means at 90° phase displacement with respect to the other of said deflection means, delay means keyed on by said keying means, said delay means being arranged to bias said cathode ray tube on at the end of a delay interval of sufficient duration to enable the voltages on said deflecting means to attain substantial equality whereby the sweep trace on the viewing screen of said cathode ray tube is substantially circular.

HARRY F. MAYER.

REFERENCES CITED

The following references are of record in the file of this patent:

UNITED STATES PATENTS

| Number | Name | Date |
|---|---|---|
| 2,103,362 | Hansell | Dec. 28, 1937 |
| 2,179,607 | Bedford | Nov. 14, 1939 |
| 2,265,848 | Lewis | Dec. 9, 1941 |
| 2,280,733 | Tolson | Apr. 21, 1942 |
| 2,313,966 | Poch | Mar. 16, 1943 |
| 2,370,685 | Rea et al. | Mar. 6, 1945 |
| 2,373,145 | Sensiper et al. | Apr. 10, 1945 |
| 2,375,709 | Thompson | May 8, 1945 |
| 2,403,278 | Hershberger | July 2, 1946 |